United States Patent [19]

Zechinati et al.

[11] 4,107,250

[45] Aug. 15, 1978

[54] PROCESS FOR MAKING FIBER-REINFORCED THERMOPLASTIC PELLETS

[75] Inventors: James Zechinati, Woodridge; Elra W. Pegg, Aurora, both of Ill.

[73] Assignee: Standard Oil Company (Indiana), Chicago, Ill.

[21] Appl. No.: 771,433

[22] Filed: Feb. 24, 1977

Related U.S. Application Data

[63] Continuation-in-part of Ser. No. 522,046, Nov. 8, 1974, abandoned, which is a continuation of Ser. No. 277,996, Aug. 4, 1972, abandoned.

[51] Int. Cl.² .............................................. B01J 2/26
[52] U.S. Cl. ..................................... 264/118; 264/122; 264/126; 264/140
[58] Field of Search ............... 264/140, 144, 108, 122, 264/126, 349, 118

[56] References Cited

U.S. PATENT DOCUMENTS

| 3,184,368 | 5/1965 | Juras ...................................... 264/126 |
| 3,250,834 | 5/1966 | Collins ................................... 264/143 |
| 3,328,383 | 6/1967 | Roscher et al. ....................... 264/122 |
| 3,732,345 | 5/1973 | Amos et al. ........................... 264/329 |

FOREIGN PATENT DOCUMENTS 1,211,737  11/1970  United Kingdom .................... 264/108

Primary Examiner—Robert F. White
Assistant Examiner—James R. Hall
Attorney, Agent, or Firm—Stanley M. Welsh; Arthur G. Gilkes; William T. McClain

[57] ABSTRACT

A method for preparing a fiber-reinforced, thermoplastic composite, wherein the fiber is randomly oriented and the fiber length and integrity is maintained, which leads to better mechanical properties and fiber dispersion in manufactured articles prepared from said composite.

6 Claims, 1 Drawing Figure

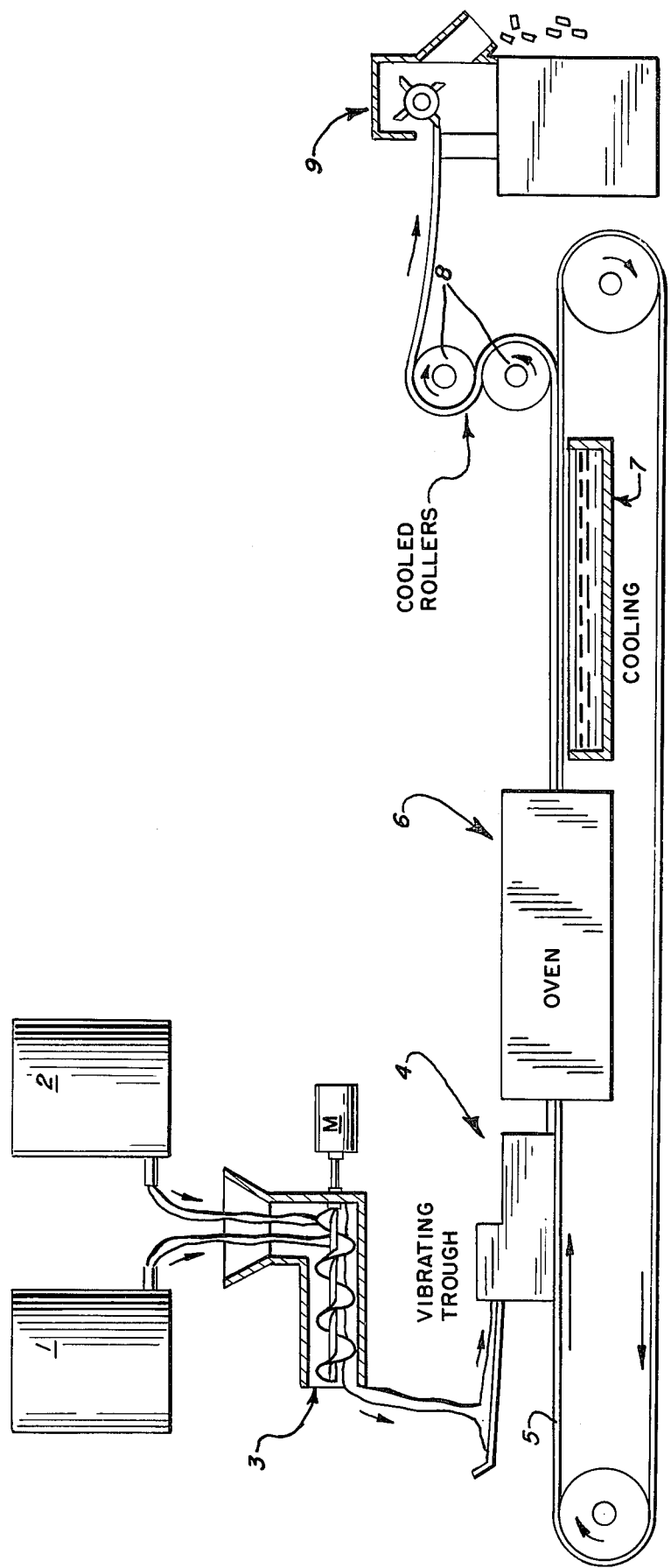

PROCESS FOR MAKING FIBER-REINFORCED THERMOPLASTIC PELLETS

RELATED APPLICATIONS

This application is a continuation-in-part of Ser. No. 522,046, filed Nov. 8, 1974, now abandoned which is a continuation of application Ser. No. 277,996, filed Aug. 4, 1972, now abandoned.

SUMMARY OF THE INVENTION

This invention relates to a novel method for preparing a belt of fiber-reinforced, thermoplastic composite from which pellets of novel composition suitable for molding purposes can be prepared; said pellets improving the properties of and fiber dispersion in manufactured articles prepared therefrom. More specifically, the invention relates to a method for preparing a continuous belt of a fiber-reinforced, thermoplastic composite, wherein fiber bundles, from, e.g., chopped continuous glass strands, are randomly oriented substantially in the plane of the belt, which belt is then cut into pellets of novel composition; said pellets being of such size and nature that their two longer dimensions are larger than the size of the fiber bundles contained therein and the fiber bundles are randomly oriented substantially in the plane of the two longer dimensions which thereby improves the properties of and fiber dispersion in manufactured articles prepared from said pellets.

In accordance with the instant invention, fiber bundles made from chopped continuous strands, compatible with the thermoplastic material at the temperature used to fluidize the latter to prepare a continuous belt of composite, are uniformly mixed with the thermoplastic material without the use of any substantial amount of shear and deposited on, for example, conveyor means in such a way as to randomize the fiber bundles substantially in the plane of the belt. This continuously applied deposit which is substantially uniform in height and width is conveyed in one direction and subjected to a temperature sufficient to fluidize the thermoplastic material so that a continuous belt of the composite is formed which then can be cooled and cut into pellets whose dimensions in the plane in which the fiber bundles are substantially randomly oriented are substantially the same as or larger than the average fiber bundle length used.

BACKGROUND OF THE INVENTION

It is common knowledge that strengthening thermoplastics with fibrous material such as glass fibers produces materials with better mechanical properties. A number of different procedures for accomplishing this end have been described, for example, the method described in U.S. Pat. No. 2,877,501 wherein a thermoplastic granule containing glass fiber oriented along a single direction is described. However, a problem encountered in present methods of preparing fiber containing thermoplastic material in granular or pelleted form for molding operations is that during the production of small pieces of the composite, the fiber is degraded in quality and length and resulting molded articles produced using the pieces show neither the uniform fiber distribution nor mechanical properties shown by molded items produced directly from thermoplastic powder and fibers without the intermediate step of producing molding composite. The intermediate step of producing a molding composite wherein the fiber and thermoplastic material is, for example, pelleted, is desirable as among other things the pellets simplify subsequent molding operations.

Now it has been found that the above problems can be avoided if pellets of thermoplastic material and fiber bundles are produced in a manner which avoids shearing during the mixing of the fiber bundle and thermoplastic material and in a manner which randomizes the fiber bundle orientation substantially in two dimensions prior to fluidization of the thermoplastic material.

STATEMENT OF THE INVENTION

Usefully, any thermoplastic material may be used in the instant invention but, more preferably, polymeric substances such as ABS, polypropylene, polyethylene, polyvinylchloride, polystyrene or copolymers thereof, for example, a block polymer of propylene and ethylene, are used. Most preferably, polypropylene is used.

The physical form of the thermoplastic material is usefully the powder form and, although the mesh size is relatively unimportant, it should be small enough to assure that an intimate and uniform mixture with the fiber bundles used can be obtained.

Fiber bundles of any glass fiber can be used with the instant invention as long as they are compatible with the thermoplastic material at the temperature used to fluidize the latter and as long as the fiber of the bundles does not soften or degrade at the fluidization temperature. More preferably, electrical grade glass fiber is the fiber used.

In the preferred embodiment wherein glass fiber bundles are used with a polyolefin such as polypropylene, it is important and preferred that the glass be sized to improve fiber bonding to the polyolefin.

Generally, the fiber bundle is precut to an average size determined in part by the size of the molding pellet to be cut from the continuous belt of composite produced. If the average fiber bundle size is substantially longer than the pellet, little improvement in strength is obtained, and, if the average fiber bundle size is considerably shorter than the pellet size, the maximum betterment of mechanical properties of the manufactured item made from the pellets is not obtained. For example, it has been found that for a quarter inch by quarter inch pellet size, glass bundles of size down to about one-sixteenth of an inch may be used.

In the preferred embodiment where glass fiber bundles are used with a polyolefin such as polypropylene, it has been found that fibers of a few mils thickness, more preferably, about 0.3 to about 0.8 mils, are useful. Also, glass fibers of average length of above about 100 mils are useful, but more preferably, above about ⅛ inch, and most preferably, fibers of average length about ⅛ inch to about ½ inch are used. Preferably, the fiber bundles are obtained from chopped continuous glass strands.

It is important that blending and distribution of the intimate mixture of thermoplastic material and fiber bundles as a continuous layer should be accomplished with a minimum of shearing action, for example, using a ribbon blender 3 and vibrating trough 4 as in the preferred embodiment shown in the Drawing. Shearing action in the mixing or distribution of the solid mixtures as a layer tends to degrade the fiber bundles by breaking them into individual fibers prior to use of the pellets for molding, and the improvement in the mechanical properties of the manufactured articles suffers thereby. This improvement in properties is obvious by comparing Examples I, IV, and VI with other Examples in the Table below.

The proportions of the fiber bundles to thermoplastic material employed depends upon the particular fiber and thermoplastic material used. The lower limit is set by the onset of reinforcing action and is generally a few weight percent of fiber bundles. The upper limit of the fiber bundles in the thermoplastic is set by the compatibility of the fiber and thermoplastic and also by the amount of fiber which can be loaded in and still maintain a composite after fluidization which will not crumble. For the preferred embodiment wherein glass fiber bundles and a polyolefin thermoplastic such as polypropylene are used, usefully about two to about sixty weight percent of glass fiber bundles can be used, more preferably, about ten to about fifty weight percent of glass fiber bundles can be used and, most preferably, about twenty to about forty weight percent of the fiber bundles is used.

DETAILED DESCRIPTION OF THE DRAWING

In the preferred embodiment of the process for making the composite shown in the Drawing, a mixture of fiber bundles from container 1 and thermoplastic material from container 2 is continuously laid on conveyor belt 5 as a layer in a manner which allows for a substantially uniform layer thickness and width. Layer width is relatively unimportant and dictated only by the convenience of the operation and available equipment size. The layer thickness should be such that the belt of composite produced after fluidization and cooling is about 0.05 inch to about 0.2 inch thick, and, more preferably, about 0.125 inch thick.

Fluidization of the thermoplastic material should be carried out in such a manner to avoid irregularities in thickness of the composite belt. It has been found that, for example, air convection heating gives a belt of irregular thickness along the belt length and width whereas in the preferred embodiment shown in the Drawing, infrared heating in a closed oven 6, a more uniform composite belt is formed.

The fluidization temperature employed depends upon the thermoplastic material used and should be sufficiently high to allow the thermoplastic to flow freely, preferably melt, but not so high as to degrade the thermoplastic material and/or fiber material used. Too high a temperature may also produce a difficult to control flow of thermoplastic material which could disturb the desired geometry of the composite belt.

Cooling of the belt of composite to a temperature where it is a reasonably stiff solid is accomplished prior to cutting or pelletizing the strip so that the knives of the cutter or pelletizer are not fouled. In the preferred embodiment in which polypropylene and fiber glass bundles are used, cooling to about 180° F. or lower is carried out prior to pelletizing by cooling the composite belt at 7 and 8 in the Drawing and then using cutter 9 to produce the pellets.

Pelletizing can be accomplished by any commercial "dicing" machine, however, it has been found preferable to use a dicer with a guillotine cutting action such as the one made by Taylor-Stiles Division of Envirotech Corporation, Cleveland, Ohio, as the pellets produed therefrom are cut cleanly and are substantially free from fiber overhand along the cut edges.

In the preferred embodiment wherein glass fiber bundles and a polyolefin such as polypropylene are used, pellet sizes of about 0.125 inch by about 0.125 inch to about 0.375 inch by about 0.375 inch are useful and, more preferably, pellets about 0.25 inch by about 0.25 inch are employed. Although the pellets need not to be cut square in the plane of random orientation of the fiber bundles, it is a convenient shape and maximizes the number of uncut fiber bundles for a given fiber bundle length and pellet size.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL

The glass fiber chopped continuous strands used is Owens-Corning (459AA-¼ inch) and the polypropylene powder is commercial grade material having a melt flow (ASTM D 1238-70) of about 8. All the compositions below were made up to contain 20 weight percent glass except those in Examples VI and VII which contain 25 and 26 weight percent glass respectively. The properties shown in the Table below were run according to standard ASTM methods as follows: Tensile Yield Strength (D638-68), Flexural Yield Strength (D790-70), Flexural Modulus (D790-70), Izod Impact Strength (D256-70) and Heat Deflection Temperature (D648-56). Relative Brightness and Yellow Index were determined with a Gardner colorimeter using Gardner ceramic plates as color and brightness standards.

EXAMPLE I

SHEET DICING PROCESS

The ¼ inch chopped strands and polypropylene powder were mixed in a ribbon blender. This dry blend was deposited onto a conveyor belt and melted in an infrared heated oven. The belt produced, which was approximately 100 mils thick, was then cooled and diced into 0.25 inch by 0.25 inch pellets. These pellets were then fed into an injection molding machine to be molded into ASTM test parts which were then tested, the results of which tests are shown in the Table below.

EXAMPLE II

DRY BLENDING

The polypropylene powder was drum tumbled with the ¼ inch chopped strands and the mixture was then fed directly into an injection molding machine to produce the ASTM test parts which were then tested, the results of which tests are shown in the Table below.

EXAMPLE III

EXTRUSION COMPOUNDING

Polypropylene powder was drum tumbled for two minutes with the ¼ inch chopped strand and this dry blend was then fed into a single screw extruder. The extruder contained a two-stage screw, was non-vented and had a barrel temperature of 425° F. The polymer was then extruded through a strand die, cooled and then pelletized. The pellet size was ⅛ inch wide by ¼ inch long. These pellets were then fed into an injection molding machine to produce ASTM test parts which were then tested, the results of which tests are shown in the Table below.

EXAMPLE IV

SHEET DICING PROCESS

The procedure of Example I was employed with the exception that the Owens-Corning chopped continuous strands used were 221A-⅛ inch. These pellets were then fed into an injection molding machine to produce ASTM test parts which were then tested, the results of which tests are shown in the Table below.

EXAMPLE V

EXTRUSION COMPOUNDING (SECOND METHOD)

Granules of Profil G 60/20 HSF were purchased from Fiberfil Division of Dart Industries. These granules were fed into an injection molding machine to produce ASTM test parts which were then tested, the results of which tests are shown in the Table below.

EXAMPLE VI

SHEET DICING PROCESS

The procedure of Example I was employed with the exception that the Owens-Corning chopped continuous strands used was 221A-⅛ inch and the polypropylene powder had a melt flow rate of 4 to 6. The pellets were then fed to an injection molding machine to produce ASTM test parts which were then tested, the results of which tests are shown in the Table below.

EXAMPLE VII

EXTRUSION COMPOUNDING (THIRD METHOD)

Polypropylene powder of melt flow rate 4 to 6 was fed into a Baker Perkins extruder and Owens-Corning chopped continuous strands (221A-⅛ inch) added through an aperture in the extruder midway between the extruder hopper and the exit head of the Baker Perkins twin screw machine. After chopping the product of the extruder into pellets, the pellets were fed into an injection molding machine to produce the ASTM test parts, the results of which tests are shown below in the Table.

What is claimed is:

1. A process comprising:
   (a) forming a uniform mixture of fibers and powdered thermoplastic material of mesh size small enough to assure uniformity and continuously depositing said mixture on a moving conveyor belt in the form of a uniform-in-thickness-and-width layer, said mixing and depositing carried out so that said fibers are not degraded by breaking and are randomly oriented substantially in a plane;
   (b) subjecting said layer to an elevated temperature whereby the thermoplastic material in said mixture flows freely, said temperature chosen to control the flow of said thermoplastic material in said mixture so that a desired geometry thereof is not disturbed and so as to avoid degrading of said thermoplastic material and said fibers;
   (c) cooling the result of (b) to form a continuous, uniform, composite belt which can be cut without fouling cutter knives and which has a height of between about five-hundredths and about one-fifth inch containing said fibers randomized substantially in the plane of said belt; and
   (d) cutting said belt into pellets, two dimensions being between one-eighths and three-eighths inch and the third dimension in the range of about 0.05 to about 0.2 inch being equal to the height of said belt.

2. The process of claim 1 wherein said fibers are chopped continuous glass strands and comprise about two to about sixty weight percent.

3. The process of claim 1 wherein said thermoplastic material is polypropylene.

4. The process of claim 3 wherein said fibers are chopped continuous glass strands and comprise about two to about sixty weight percent.

5. The process of claim 2 wherein the weight percent of said fiber is between about two and about sixty percent of the total weight of said fibers and thermoplastic material.

6. The process of claim 4 wherein the weight percent of said strands is between about two and about sixty percent of the total weight of said strands and thermoplastic material.

* * * * *

TABLE

Effect Of Compounding Method On The Properties Of Injection Molded Test Parts

| Type of Compounding | Tensile Yield Strength (p.s.i.) | Flexural Yield Strength (p.s.i.) | Flexural Modulus (p.s.i.) | Notched Izod Impact Strength (ft. lbs./in. notch) | Heat Deflection Temperature (° F. at 264 p.s.i.) | Color Relative Brightness | Yellow Index |
|---|---|---|---|---|---|---|---|
| Example I | 10,300 | 14,000 | 570,000 | 3.7 | 290 | | |
| Example II | 10,000 | 13,700 | 555,000 | 3.6 | 285 | | |
| Example III | 8,000 | 10,000 | 550,000 | 1.0 | 260 | | |
| Example IV | 10,400 | 14,000 | 600,000 | 2.9 | 299 | | |
| Example V | 8,160 | 11,600 | 574,000 | 2.9 | 270 | | |
| Example VI* | 10,800 | 14,800 | 680,000 | 3.2 | 304 | 66 | 16.1 |
| Example VII* | 10,500 | 13,800 | 708,000 | 2.1 | 306 | 60 | 20.7 |

*Each property value given for these two Examples is the average of ten separate determinations.